(12) United States Patent
Keigley

(10) Patent No.: US 11,770,989 B1
(45) Date of Patent: Oct. 3, 2023

(54) TOW-BEHIND ROLLER TOOL APPARATUSES, SYSTEMS AND METHODS

(71) Applicant: ABI ATTACHMENTS, INC., Mishawaka, IN (US)

(72) Inventor: Kevin V. Keigley, Osceola, IN (US)

(73) Assignee: ABI Attachments Inc., Mishawaka, IN (US)

( * ) Notice: Subject to any disclaimer, the term of this patent is extended or adjusted under 35 U.S.C. 154(b) by 176 days.

(21) Appl. No.: 17/410,296

(22) Filed: Aug. 24, 2021

Related U.S. Application Data

(60) Provisional application No. 63/069,857, filed on Aug. 25, 2020.

(51) Int. Cl.
*A01B 29/06* (2006.01)
*A01B 29/04* (2006.01)
*A01B 63/32* (2006.01)

(52) U.S. Cl.
CPC ............ *A01B 29/06* (2013.01); *A01B 29/041* (2013.01); *A01B 63/32* (2013.01)

(58) Field of Classification Search
CPC ....... A01B 29/06; A01B 29/041; A01B 63/32; A01B 27/00; A01B 27/005; A01B 23/046; A01B 49/027; A01B 45/00; A01B 63/112; A01B 63/114; A01B 63/111; A01B 61/046; A01B 61/044; A01B 45/02; A01B 33/024; A01B 21/04; A01B 17/004; A01B 9/003
See application file for complete search history.

(56) References Cited

U.S. PATENT DOCUMENTS

| | | | |
|---|---|---|---|
| 1,764,944 A | | 6/1930 | Fisher |
| 2,398,147 A | * | 4/1946 | McKay ................ A01B 23/046 172/477 |
| 2,660,817 A | * | 12/1953 | Thomas ................ A01B 29/04 172/705 |
| 2,839,983 A | | 6/1958 | Walsh |
| 4,193,457 A | * | 3/1980 | Sphar .................. A01B 29/045 172/810 |
| 4,625,990 A | | 12/1986 | Orth et al. |
| 4,844,495 A | | 7/1989 | Frost |

(Continued)

FOREIGN PATENT DOCUMENTS

| | | | | |
|---|---|---|---|---|
| BE | 901768 A | * | 6/1985 | ............ A01B 29/00 |
| DE | 4116417 A | * | 11/1992 | ............ A01B 29/06 |
| WO | WO-2007123479 A1 | * | 11/2007 | ........... A01B 29/043 |

*Primary Examiner* — Adam J Behrens
*Assistant Examiner* — Blake E Scoville
(74) *Attorney, Agent, or Firm* — Taft Stettinius & Holliser LLP

(57) ABSTRACT

An apparatus includes a roller assembly including a roller frame and ground-contacting roller rotatably coupled with the roller frame. A suspension assembly includes a compressible suspension member operatively coupled with the roller assembly. A flexible rigging assembly includes an upper flexible rigging member and a lower flexible rigging member operatively coupled with the suspension assembly. The flexible rigging assembly is adjustable between a first state in which the upper flexible rigging member is taut and the lower flexible rigging member has a non-zero amount of upper flexible rigging member slack and a second state in which the lower flexible rigging member is taut and the upper flexible rigging member has a non-zero amount of lower flexible rigging member slack.

20 Claims, 11 Drawing Sheets

(56) References Cited

U.S. PATENT DOCUMENTS

| | | | |
|---|---|---|---|
| 4,896,730 A | 1/1990 | Jarrett et al. | |
| 6,068,061 A | 5/2000 | Smith et al. | |
| 6,962,039 B2 * | 11/2005 | Greenhoe | A01B 29/043 56/16.7 |
| 7,987,917 B1 * | 8/2011 | Kornecki | A01B 29/02 172/554 |
| 9,883,621 B2 * | 2/2018 | Keigley | A01B 63/145 |
| 10,287,745 B1 * | 5/2019 | Keigley | E02F 3/8157 |
| 10,412,874 B2 | 9/2019 | Post | |
| 2015/0216108 A1 | 8/2015 | Roth et al. | |
| 2015/0289439 A1 | 10/2015 | Wehler et al. | |
| 2016/0374264 A1 | 12/2016 | Roth et al. | |
| 2018/0228073 A1 | 8/2018 | Milford | |
| 2019/0037760 A1 | 2/2019 | Post | |
| 2019/0380253 A1 | 12/2019 | Thielicke et al. | |
| 2020/0205333 A1 | 7/2020 | Degelman | |

* cited by examiner

US 11,770,989 B1

TOW-BEHIND ROLLER TOOL APPARATUSES, SYSTEMS AND METHODS

CROSS REFERENCE

The present application claims the benefit of and priority to U.S. Application No. 63/069,857 filed Aug. 25, 2020 the disclosure of which is hereby incorporated by reference.

BACKGROUND

The present disclosure relates generally to tow-behind roller tool apparatuses, systems, and methods for coupling ground working tools with work machines. A number of roller tools have been proposed. Heretofore, such roller tools have suffered from a number of drawbacks and disadvantages. There remains a substantial need for the unique apparatuses, systems, and methods disclosed herein.

DISCLOSURE OF EXAMPLE EMBODIMENTS

For the purposes of clearly, concisely and exactly describing example embodiments of the present disclosure, the manner, and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created and that the invention includes and protects such alterations, modifications, and further applications of the exemplary embodiments as would occur to one skilled in the art.

SUMMARY OF THE DISCLOSURE

One embodiment is a unique system comprising a work machine with a tow-behind roller tool. Other embodiments, forms, objects, features, advantages, aspects, and benefits shall become apparent from the following description and drawings.

DETAILED DESCRIPTION OF EXAMPLE EMBODIMENTS

Figure 1:
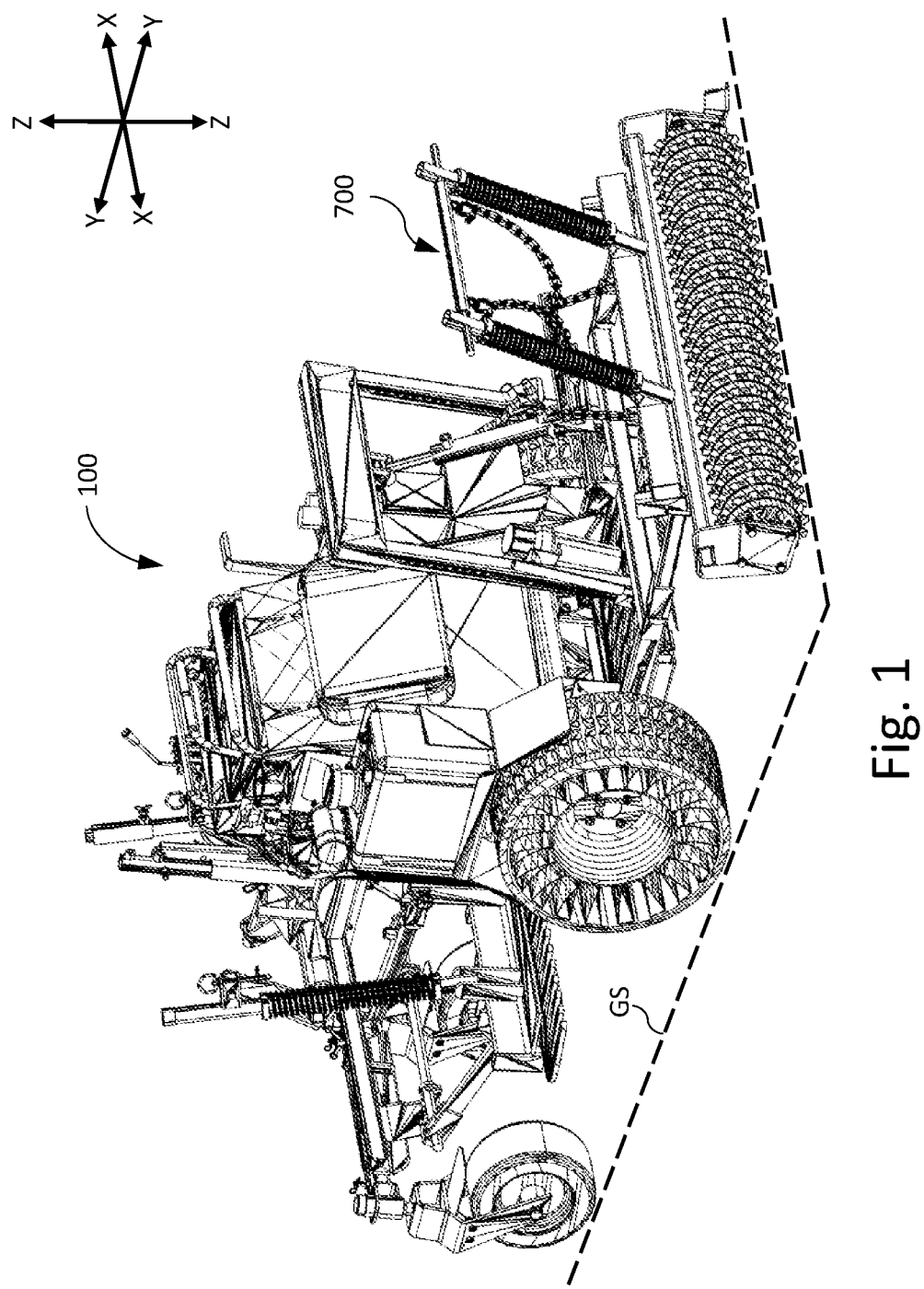
FIG. 1 is a first perspective view illustrating certain aspects of an example system comprising a work machine with a tow-behind roller tool.
Figure 2:
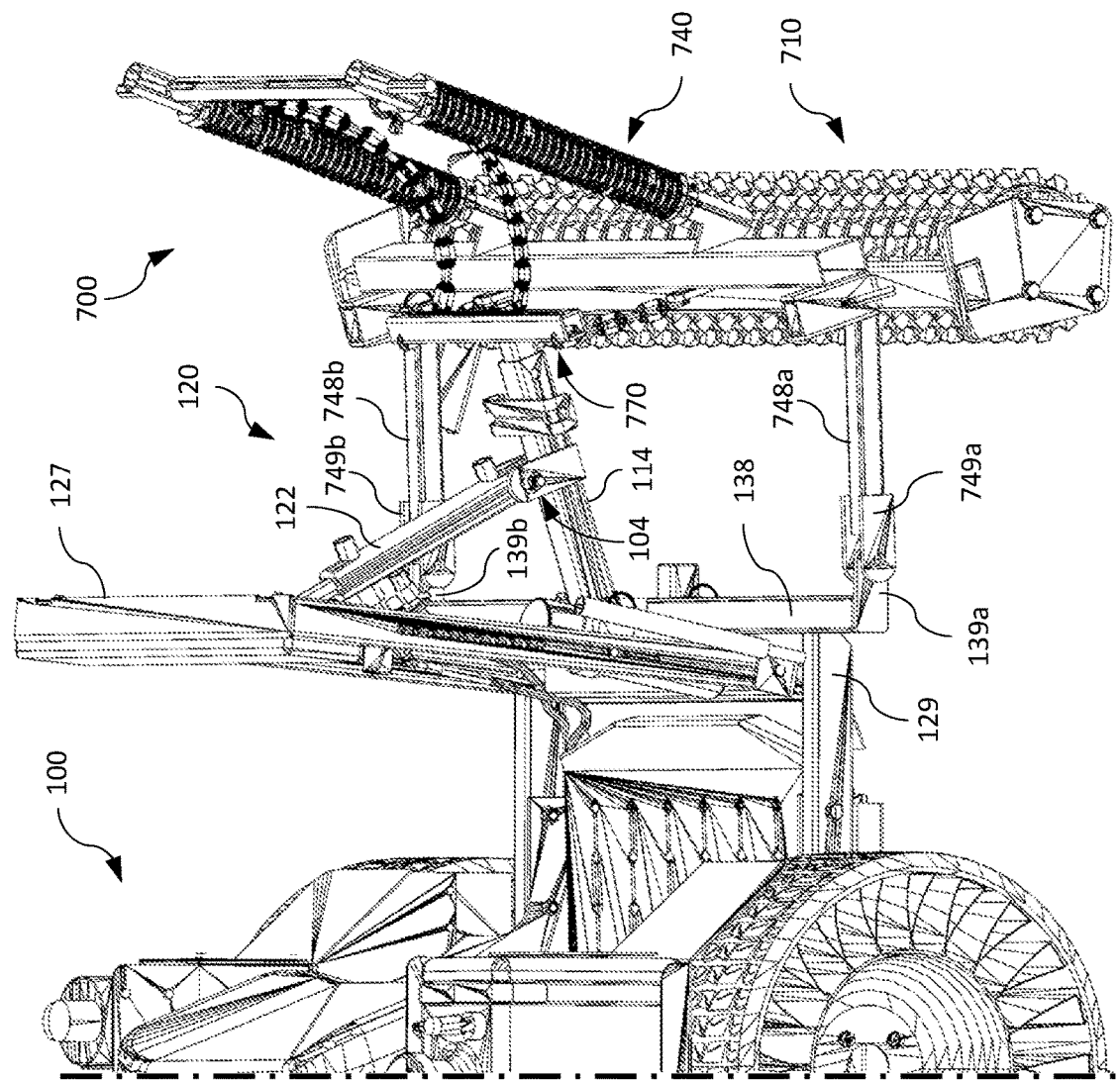
FIG. 2 is a second perspective view of a portion of the system of FIG. 1.

Referring now to the figures and initially with particular but not exclusive reference to FIGS. 1 and 2, there is illustrated an example system including a self-propelled work machine 100 coupled with a tow-behind roller tool 700. Self-propelled work machine 100 may be referred to herein as work machine 100 or machine 100. Tow-behind tool 700 may be referred to herein as tool 700. It shall be appreciated that number of structural components or elements disclosed herein are described as being attached, coupled, or joined to one another or as attaching, coupling, or joining other structural components or elements which shall be understood to encompass a number of attachment, coupling, or joining structures and techniques, for example, adhesion, bolting, bonding, brazing, clamping, formation as an integral or unitary structure with coupled portions, screwing, riveting, welding or other attachment, coupling or joining techniques as will occur to one of skill in the art with the benefit of the present disclosure except as otherwise expressly or logically limited or excluded. The assemblies of components disclosed herein are likewise understood to encompass such attachment or coupling structures and techniques except as otherwise expressly or logically limited or excluded.

In the illustrated embodiment, the work machine 100 is a self-propelled, zero-turn radius work machine. In certain forms, the work machine 100 may be configured as a zero-turn radius work machine as described in U.S. Pat. Nos. 9,332,687 and 9,883,621 the disclosures of which are incorporated herein by reference. In other embodiments, various other types of work machines may be utilized, such as other types of zero-turn radius work machine, a riding lawnmower, a lawn tractor, and ATV or a variety of other types of work machines capable of towing a ground working tool.

The work machine 100 includes an actuator 120 comprising a hydraulic cylinder 122 which is coupled with a lifting arm 114 at a joint 104 which permits rotation of the hydraulic cylinder 122 relative to the lifting arm 114 in the direction generally indicated by arrow R1. The hydraulic cylinder 122 is also coupled with a vertically extending operator support member 127 of the work machine 100 at a joint 103 which permits rotation of the hydraulic cylinder 122 relative to the operator support member 127. The lifting arm 114 is coupled with a frame member 129 of the work machine 100 at a joint 105 which permits rotation of the lifting arm 114 relative to the frame member 129. It shall be appreciated that the lifting arm 114 is an example of a lifting member of a work machine according the present disclosure. Other embodiments may additionally or alternatively include other lifting members including, for example, jack devices such as arm type, bottle-type, scissor-type, and other jack types, mechanical linkages, additional or hydraulic or pneumatic adjustment mechanisms, rack, and pinion mechanisms, ratchet mechanisms, screw mechanisms, winch devices including a spool rotatable to wind and unwind a line or other flexible rigging member or other types of lifting members as will occur to one of skill in the art with the benefit of the present disclosure.

The work machine further includes a beam member 138 which is provided at a rearward location of the work machine 100 and hinge members 139*a*, 139*b* which are coupled with and extend in a rearward longitudinal direction from the beam member 138. The actuator 120 is adjustable and actuatable by selectably supplying pressurized hydraulic fluid from hydraulic fluid lines (not illustrated) which are configured to supply pressurized hydraulic fluid to the actuator 120 to expand or contract the length of the hydraulic cylinder 122. Such adjustment of the actuator 120 causes the lifting arm 114 to rotate about the joint 105 in the direction indicated by arrow R1.

The tow-behind tool 700 includes a roller assembly 710, a suspension assembly 740, and a flexible rigging assembly 770 which are coupled with one another and operable together in an assembled state. It shall be appreciated that the roller assembly 710, the suspension assembly 740, and the flexible rigging assembly 770 are examples of assembled or coupled components of an example tool and that the tool 700 or other tools according to the present disclosure may also be described in terms of other assemblies or couplings of components with or without varying the components, features, or structures of the tool 700 or their assembly, form, or state of adjustment.

The roller assembly 710 includes a beam 730 extending laterally along a length in a direction parallel to the X-axis of the illustrated X-Y-Z coordinate system. The posts 732a, 732b are coupled with and extend vertically upward from the beam 730 at respective locations 731a, 731b laterally spaced apart along the length of the beam 730. In the illustrated embodiment, the posts 732a, 732b extend vertically upward at an angle offset from the Z-axis of the illustrated X-Y-Z coordinate system, it being appreciated that other vertically upward orientations, such as vertically upward orientations parallel with the Z-axis or at other angles offset from the Z-axis, are contemplated in other embodiments. Brackets 734a, 734b extend vertically downward from the beam 730 at respective locations 733a, 733b laterally spaced apart along the length of the beam 730. In the illustrated embodiment, the brackets 734a, 734b extend vertically downward at an angle offset from the Z-axis of the illustrated X-Y-Z coordinate system, it being appreciated that other vertically downward orientations, such as vertically downward orientations parallel with the Z-axis or at other angles offset from the Z-axis, are contemplated in other embodiments. A ground-contacting roller 720 is rotatably coupled with the brackets 734a, 734b, and extends axially between ends 721a, 721b.

The suspension assembly 740 includes receivers 742a, 742b which are configured to receive and couple with the posts 732a, 732b. In the illustrated embodiment, the coupling of the posts 732a, 732b with the receivers 742a, 742b, respectively, is provided at least in part by the posts 732a, 732b being inserted into and received in the receivers 742a, 742b and pins 743a, 743b which are instated into and pass through aligned apertures in the posts 732a, 732b and the receivers 742a, 742b. Such coupling allows and provides reversible coupling and decoupling of the posts 732a, 732b with the receivers 742a, 742b without the use of tools. Of course, it shall be appreciated that other types of couplings such as those disclosed herein are also contemplated in other embodiments.

A beam 741 is coupled with and extends laterally between the receivers 742a, 742b. Pull arms 748a, 748b are coupled with the suspension assembly 740 and extend longitudinally forward of the receivers 742a, 742b. In the illustrated embodiment, the pull arms 748a, 748b are coupled with the receivers 742a, 742b of the suspension assembly 740. In other embodiments the pull arms 748a, 748b may be coupled additionally or alternatively with other components of the suspension assembly 740 such as the beam 741.

Compressible suspension members 750a, 750b are coupled with and extend vertically upward from the beam 741. The compressible suspension members 750a, 750b include lower shaft members 756a, 756b which are coupled with beam 741 by brackets 757a, 757b. Lower shaft members 756a, 756b are further received by and are slidable relative upper shaft members 751a, 751b in a telescoping relationship and which may also be fixed relative to one another by pins (not illustrated) which may be inserted into and pass through aligned apertures in the lower shaft members 756a, 756b and the upper shaft members 751a, 751b. Springs 752a, 752b are mounted around and extend along portions of the lower shaft members 756a, 756b, and the upper shaft members 751a, 751b intermediate upper stop collars 753a, 753b and lower stop collars 755a, 755b. The positioning of upper stop collars 753a, 753b, and lower stop collars 755a, 755b may be adjusted to provide a degree of pre-compression of springs 752a, 752b ranging from zero pre-compression to a maximum degree of pre-compression wherein the springs 752a, 752b are substantially maximally compressed.

The springs 752a, 752b are examples of compressible members of a suspension according to the present disclosure and are configured and provided as coil springs in the illustrated embodiment. Other embodiments may additionally or alternatively include other types of compressible members, for example, elastomeric compressible members, other types of compressible spring members, and other types of compressible members as will occur to one of skill in the art with the benefit of the present disclosure. It shall also be appreciated that a variety of other suspensions members may be utilized in various embodiments in addition to or instead of the illustrated configuration including shock absorbers, elastomeric suspension elements, compressible members, pneumatic suspension elements, hydraulic suspension elements, other spring arrangements and combinations of the foregoing and/or other suspension elements.

A crossbar 761 is positioned vertically upward from the beam 741 and is coupled with and extends between the compressible suspension members 750a, 750b. A rotatable sleeve 762 is provided around the crossbar 761 and is coupled with flexible rigging members 777a, 777b which provide an upper flexible coupling of the suspension assembly 740 and the flexible rigging assembly 770. The flexible rigging members 777a, 777b are coupled with a connector bar 771.

The connector bar 771 provides a single connection hookup for coupling the flexible rigging members 776a, 776b and 777a, 777b with the lifting arm 114. In the illustrated embodiment, the connector bar 771 is provided in an example T-bar configuration and includes a lateral bar member 772 which is coupled with the flexible rigging members 777a, 777b, and a longitudinal bar member 773 which is coupled with and extends longitudinally forward of the lateral bar member 772.

In an assembled state, the longitudinal bar member 773 is coupled with the lifting arm 114. In the illustrated embodiment such coupling is provided by the longitudinal bar member 773 being inserted into and received by a receiver of the lifting arm 114 and maintained in place by pins which are inserted into and pass through aligned apertures in the longitudinal bar member 773 and the receiver of the lifting arm 114. Of course, it shall be appreciated that other types of couplings such as those disclosed herein are also contemplated in other embodiments.

Flexible rigging members 776a, 776b are coupled with and extend between the connector bar 771 and the beam 741, which provide a lower flexible coupling of the suspension assembly 740 and the flexible rigging assembly 770. In the illustrated embodiment, the lower flexible rigging members 776a, 776b, and the upper flexible rigging members 777a, 777b comprise lengths of chain. In other embodiments, the lower flexible rigging members 776a, 776b, and the upper flexible rigging members 777a, 777b may additionally or alternatively comprise cables, lines, ropes, wires, or other types of flexible rigging members.

The hinge members 749a, 749b are coupled with and extend in a forward longitudinal direction from the pull arms 748a, 748b. The hinge members 749a, 749b are also coupled with the hinge members 139a, 139b of the work machine 100 by pins 709a 709b which are inserted into and pass through aligned apertures in the hinge members 749a, 749b and the hinge members 139a, 139b. Such coupling allows and provides reversible coupling and decoupling of the hinge members 749a, 749b with the hinge members 139a, 139b without the use of tools. Of course, it shall be appreciated that other types of couplings such as those disclosed herein are also contemplated in other embodiments.

The coupling of the hinge members 749a, 749b, and the hinge members 139a, 139b permit rotation of the pull arms 748a, 748b, and the structures coupled therewith relative to the work machine 100 in the direction generally indicated by arrow R2. Such rotation may occur passively, for example, in response to variation in an underlying ground surface when the hinge members 139a, 139b are rotated such that the roller assembly 710 is in contact with the underlying ground surface. Such rotation may also occur actively, for example, in response to actuation of the hydraulic cylinder 122 to rotate the lifting member in the direction generally indicated by arrow R1 which is effective to raise and lower the roller assembly 710 and the suspension assembly 740 relative to an underlying ground surface over a range of adjustment.

Figure 3A:
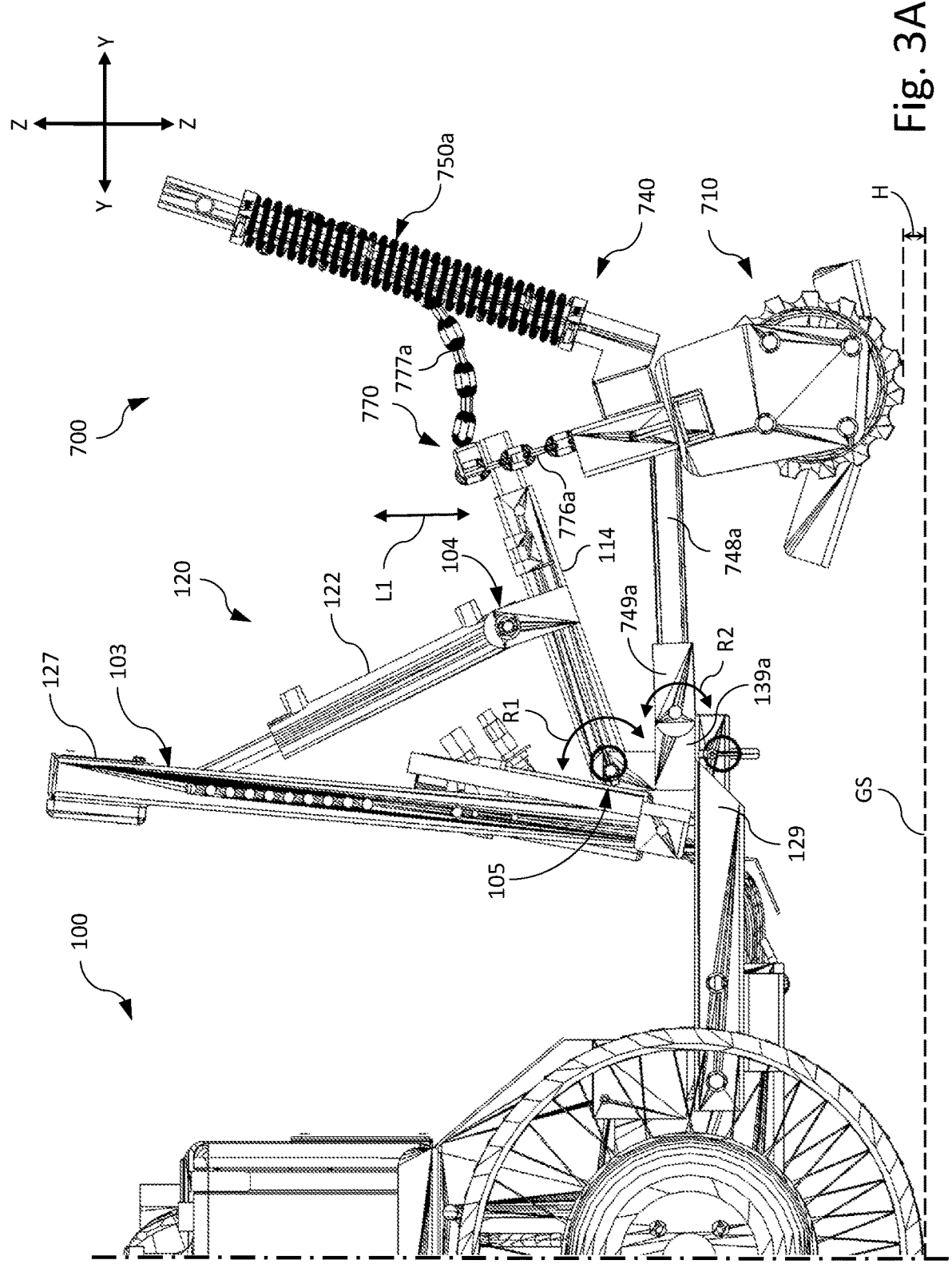
FIG. 3A is a side view of a portion of the system of FIG. 1 in a first state of adjustment.

In the illustrated embodiment, the range of adjustment includes a lifted state of adjustment illustrated in FIG. 3A where the lifting arm 114 is rotated to the illustrated lifted position and the assembly 710 is raised above and spaced apart from an underlying ground surface GS by a distance indicated by arrow H. The range of adjustment further includes other lifting states in which and the lifting arm 114 is rotated to other lifting positions and the roller assembly 710 is raised above and spaced apart from an underlying ground surface GS to a greater or lesser distance. In such states of adjustment, the flexible rigging members 776a, 776b are taut and support the weight of the roller assembly 710 and the suspension assembly 740 in a raised position. In contrast, the flexible rigging members 777a, 777b are provided with a degree of slack and are not required to support the weight of the roller assembly 710 and the suspension assembly 740. The lifted states of adjustment provide carrying positions of the roller assembly 710 which can be utilized to transport the roller assembly to different locations without the roller assembly 710 contacting an underlying ground surface GS.

Figure 3B:
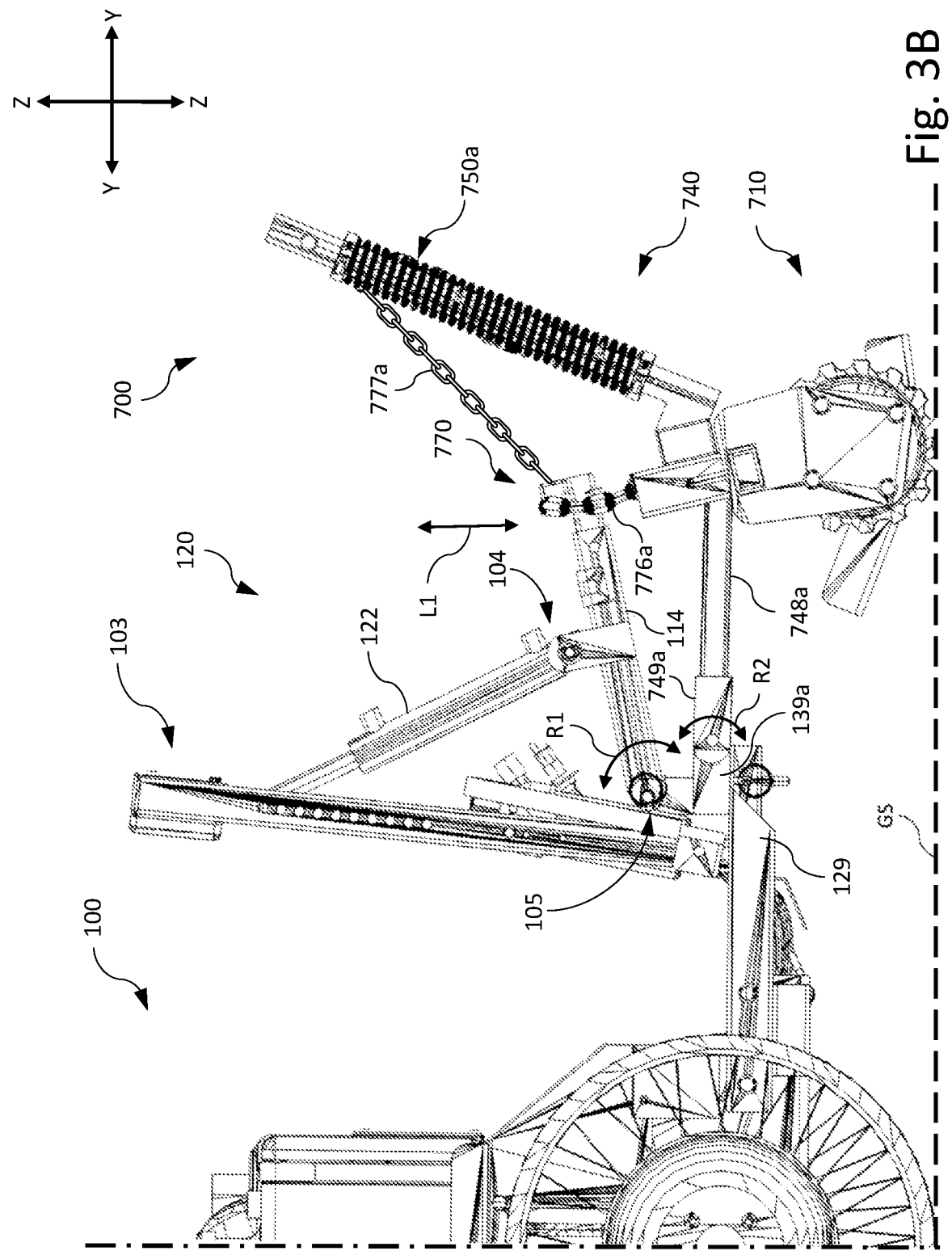
FIG. 3B is a side view of a portion of the system of FIG. 1 in a second state of adjustment.

The range of adjustment also includes a neutral state of adjustment illustrated in FIG. 3B where the lifting arm 114 is rotated to the illustrated neutral position and the roller assembly 710 is lowered relative to the state of adjustment of FIG. 3A such that the roller assembly 710 contacts the underlying ground surface GS without applying down force to the roller assembly 710 and the suspension assembly 740. In the state of adjustment illustrated in FIG. 3B, the flexible rigging members 776a, 776b are provided with a degree of slack and are not required to support the weight of the roller assembly 710 and the suspension assembly 740 while the flexible rigging members 777a, 777b are nominally taut while applying substantially zero downforce (aside from the weight of the flexible rigging members 777a, 777b) on the suspension assembly. This state of adjustment is an example of a float state of adjustment which provides down force on the roller assembly 710 substantially equal to the weight of the suspension assembly 740 and, in turn, provided down force on the underlying ground surface substantially equal to the combined weight of the suspension assembly 740 and the roller assembly 710. The combined weight of the suspension assembly 740 and the roller assembly 710 may be about 150 pounds plus or minus 50 pounds or may be another weight providing desired compaction capability.

The lifting arm 114 may also be adjusted to other neutral positions providing other float states of adjustment. For example, the lifting arm 114 may be raised relative to the position illustrated in FIG. 3B such that flexible rigging members 776a, 776b are taut and support a portion of the weight of the roller assembly 710 and the suspension assembly 740. This float state of adjustment provides a feather-float or tickle-float operation of the roller assembly wherein the downforce on the underlying ground surface is greater than zero but less than the combined weight of the suspension assembly 740 and the roller assembly 710. In other examples, the lifting arm 114 may be rotated to other neutral positions in which the flexible rigging members 776a, 776b are provided with various degrees of slack (or may be nominally taut without supporting any weight) and are not required to support the weight of the roller assembly 710 and the suspension assembly 740.

Figure 3C:
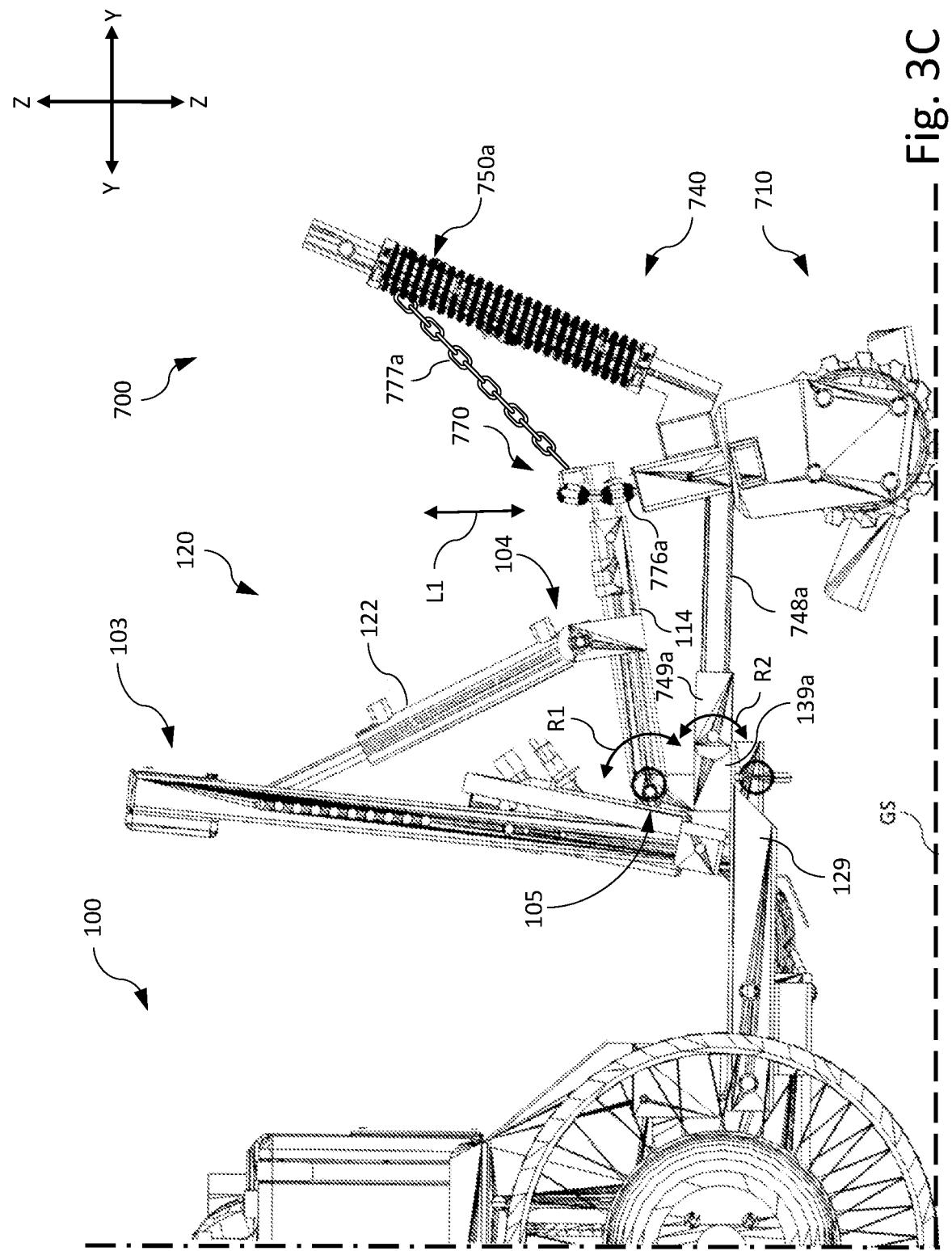
FIG. 3C is a side view of a portion of the system of FIG. 1 in a third state of adjustment.

The range of adjustment also includes a compressive state of adjustment illustrated in FIG. 3C where the lifting arm 114 is rotated to the illustrated compressive position and the roller assembly 710 contacts and applies downward force against the underlying ground surface GS due to compression of the compressible suspension members 750a, 750b by compressive force applied by the flexible rigging members 777a, 777b. In such states of adjustment, the flexible rigging members 777a, 777b are taut and apply a compressive force to the compressible suspension members 750a, 750b via the crossbar 761. In contrast, the flexible rigging members 767a, 776b are provided with a degree of slack and are not required to apply a compressive force to the compressible suspension members 750a, 750b.

The addition of compressive force to the compressible suspension members 750a, 750b may be controller by adjusting the lifting arm 114 to provide a controllable amount of additional downforce to the underlying ground surface greater than the amount of ground force provided in the float mode adjustment illustrated in FIG. 3B. In certain embodiments the compressible suspension members 750a, 750b may each provide about 35 pounds of additional force per inch of compression or a net of 70 pounds of additional force per inch of compression and may be compressed up to two inches to provide up to an additional 150 pounds of downforce on the underlying ground surface. Other embodiments may include other compressible suspension members providing different amounts of additional downforce per unit of compression distance or different maximum additional pounds of downforce.

The addition of compressive force to the compressible suspension members 750a, 750b also decreases the downforce applied to the underlying ground surface by the rear wheels of the work machine 100 by transferring a portion of the weight of the work machine to the roller assembly 710. In certain embodiments, the transfer of weight may remove up to 250 pounds from the rear wheels of the work machine 100. In other embodiments, the transfer of weight may remove other amounts of weight from the rear wheels of the work machine 100 to reduce the impact of the work machine on the conditioning of the underlying ground surface. The length of the flexible rigging members 777a, 777b may be selected or tuned to set a limit on the transfer of weight to maintain the rear wheels of the work machine 100 in operative engagement with the underlying ground surface and the compressive force characteristics of the compressible suspension members 750a, 750b may also be taken into account in this regard. The length of the flexible rigging members 777a, 777b may also be variable, for example, increasable or disconnectable to increase the limit on the transfer of weight to a degree effective to raise the rear wheels of the work machine 100 above the underlying ground surface to facilitate inspection, adjustment, removal, and replacement of the rear wheels. The compressive force characteristics of the compressible suspension members 750a, 750b may also be taken into account in this regard.

Figure 4:
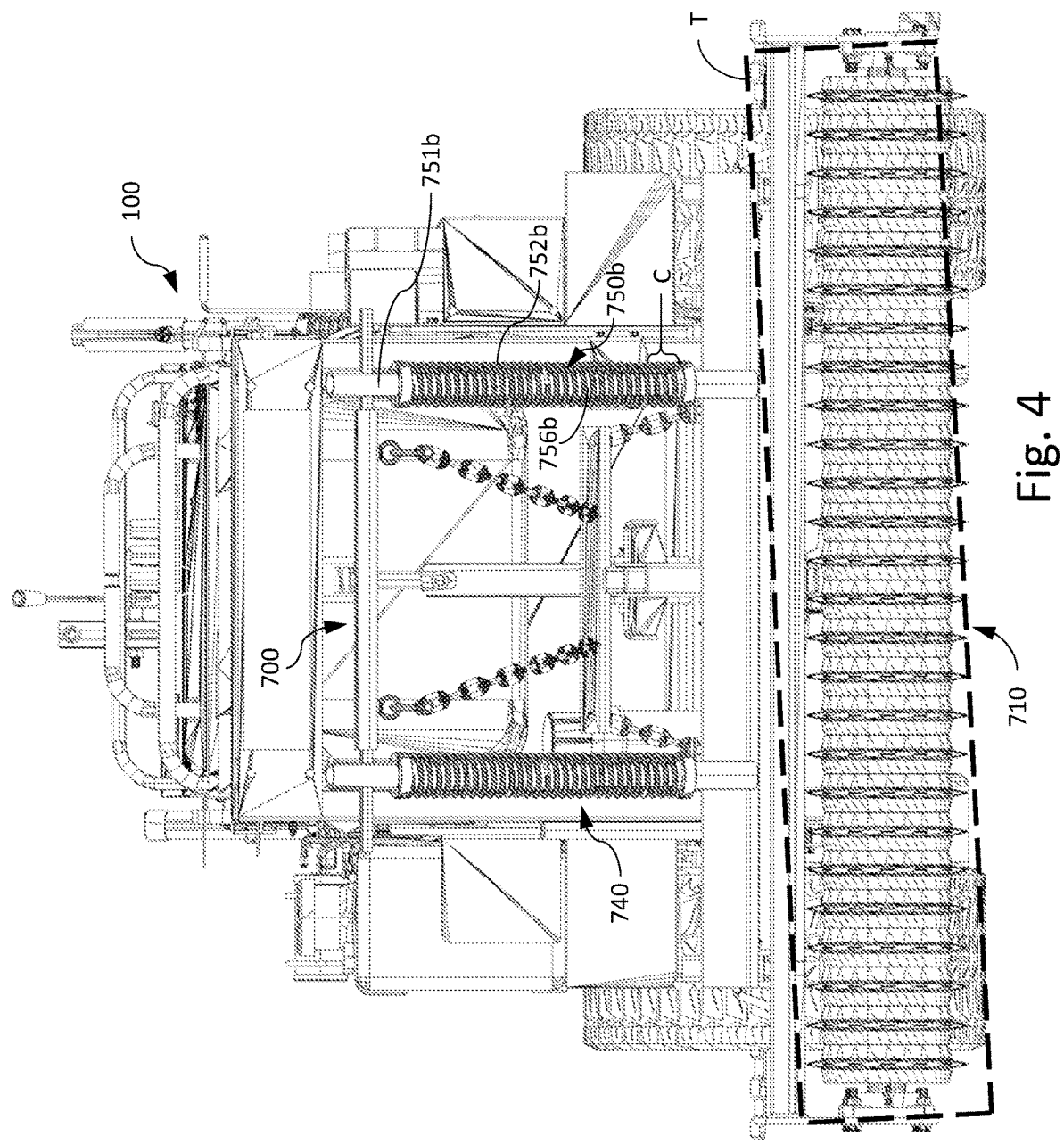
FIG. 4 is a side view of a portion of the system of FIG. 1 in a fourth state of adjustment.
Figure 5:
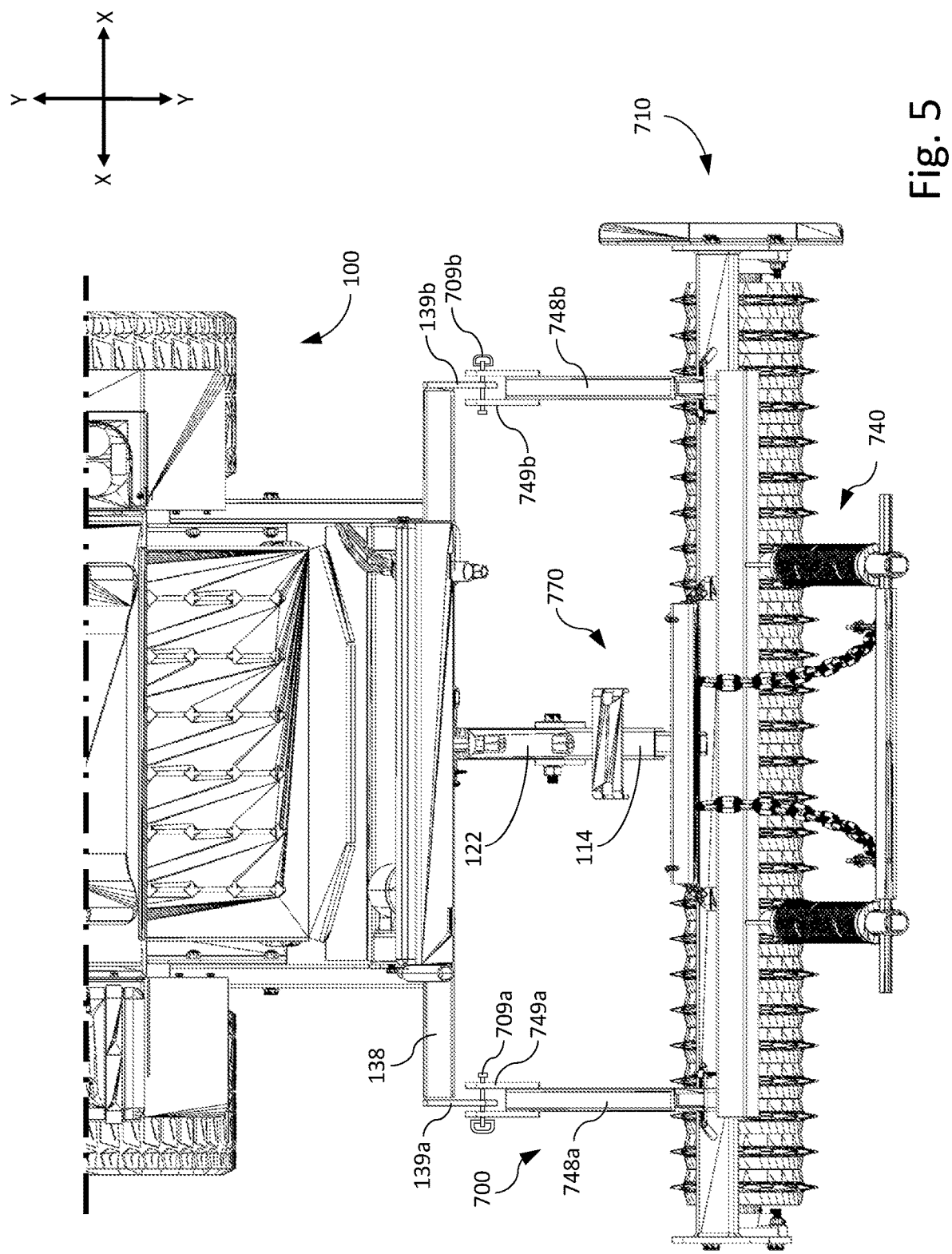
FIG. 5 is a top view of a portion of the system of FIG. 1.
Figure 6:
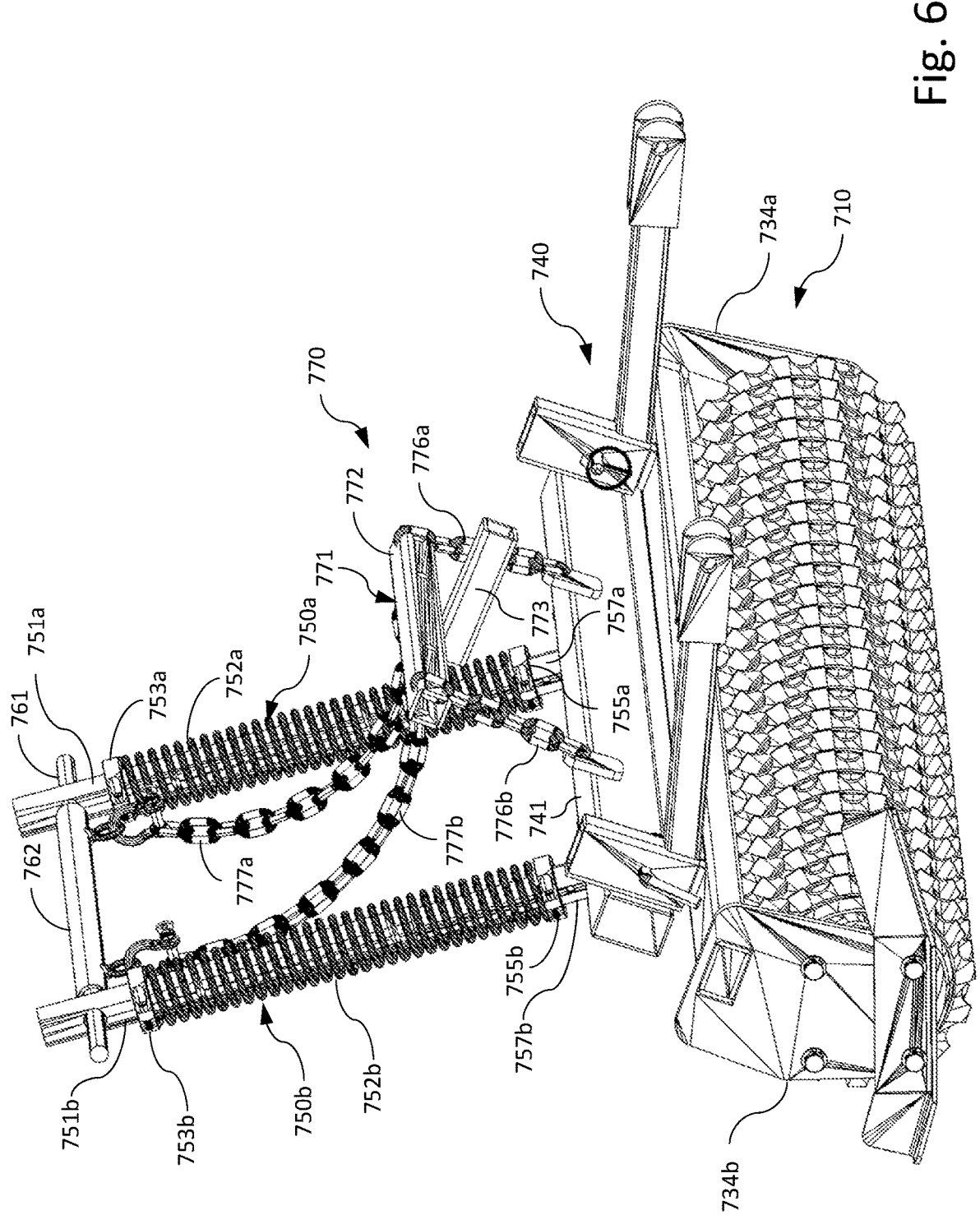
FIG. 6 is a first perspective view of the tow-behind roller tool FIG. 1.
Figure 7:
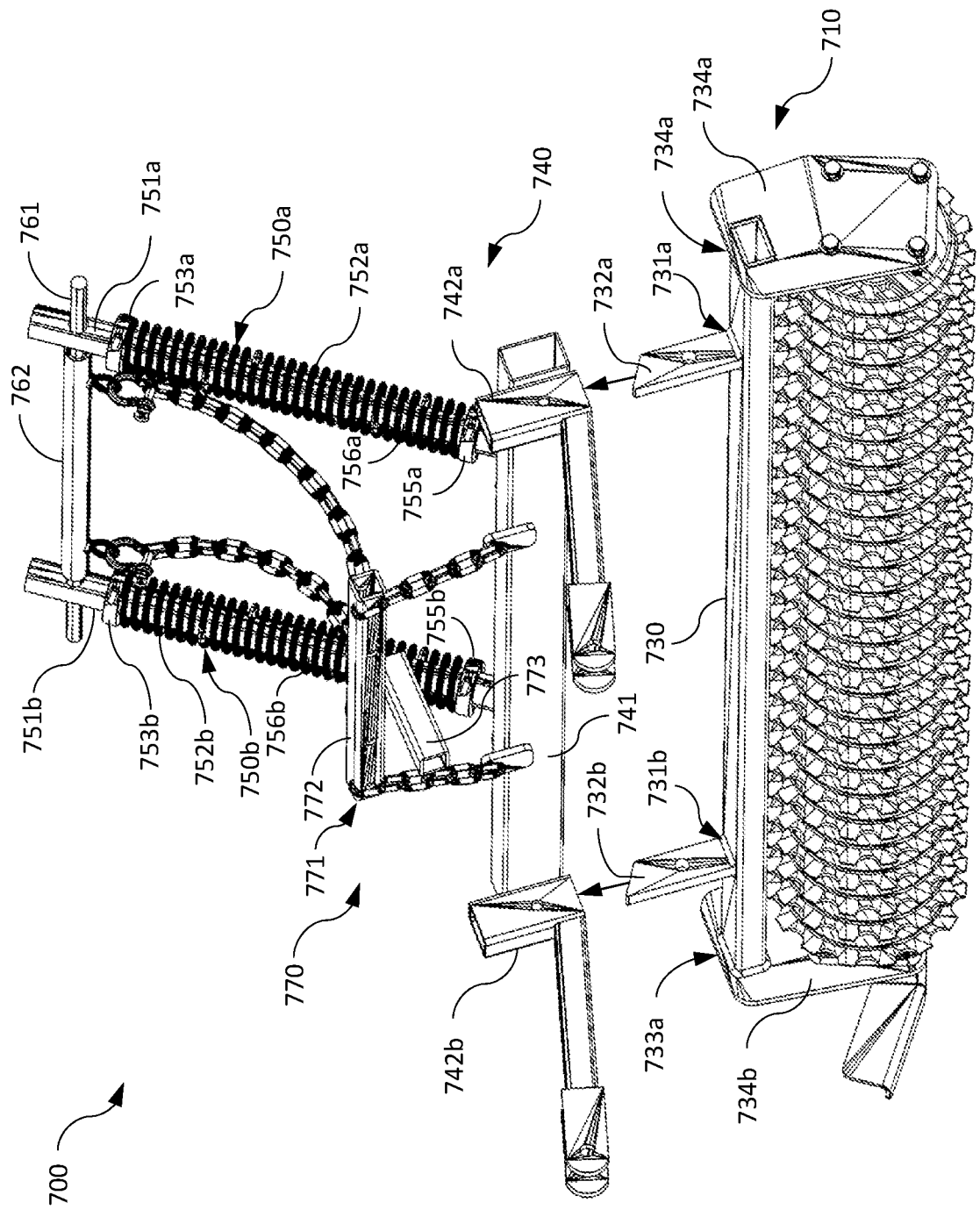
FIG. 7 is a second perspective view of the tow-behind roller tool FIG. 1 in a partially disassembled state.
Figure 8:
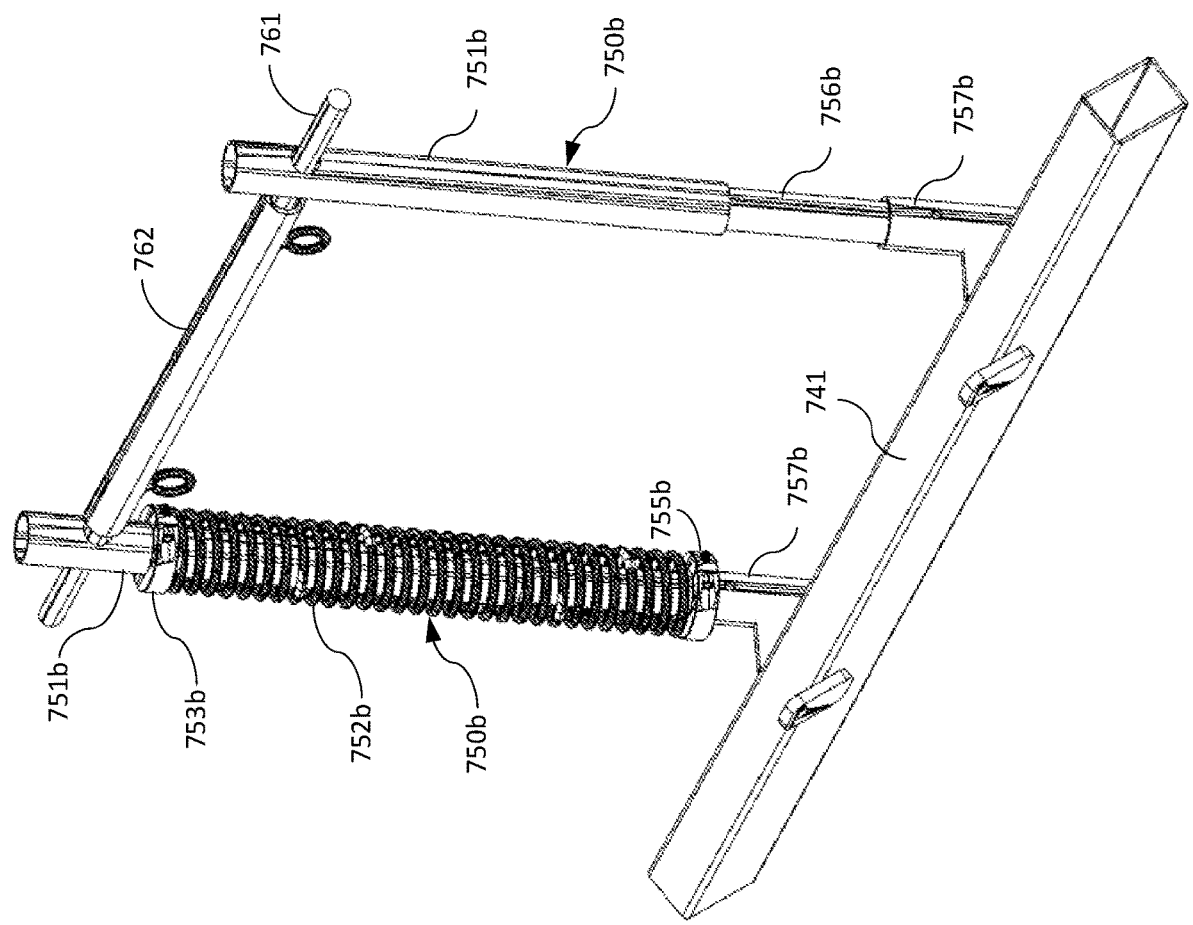
FIG. 8 is a perspective view of certain components of the tow-behind roller tool FIG. 1 in a partially disassembled state.
Figure 9:
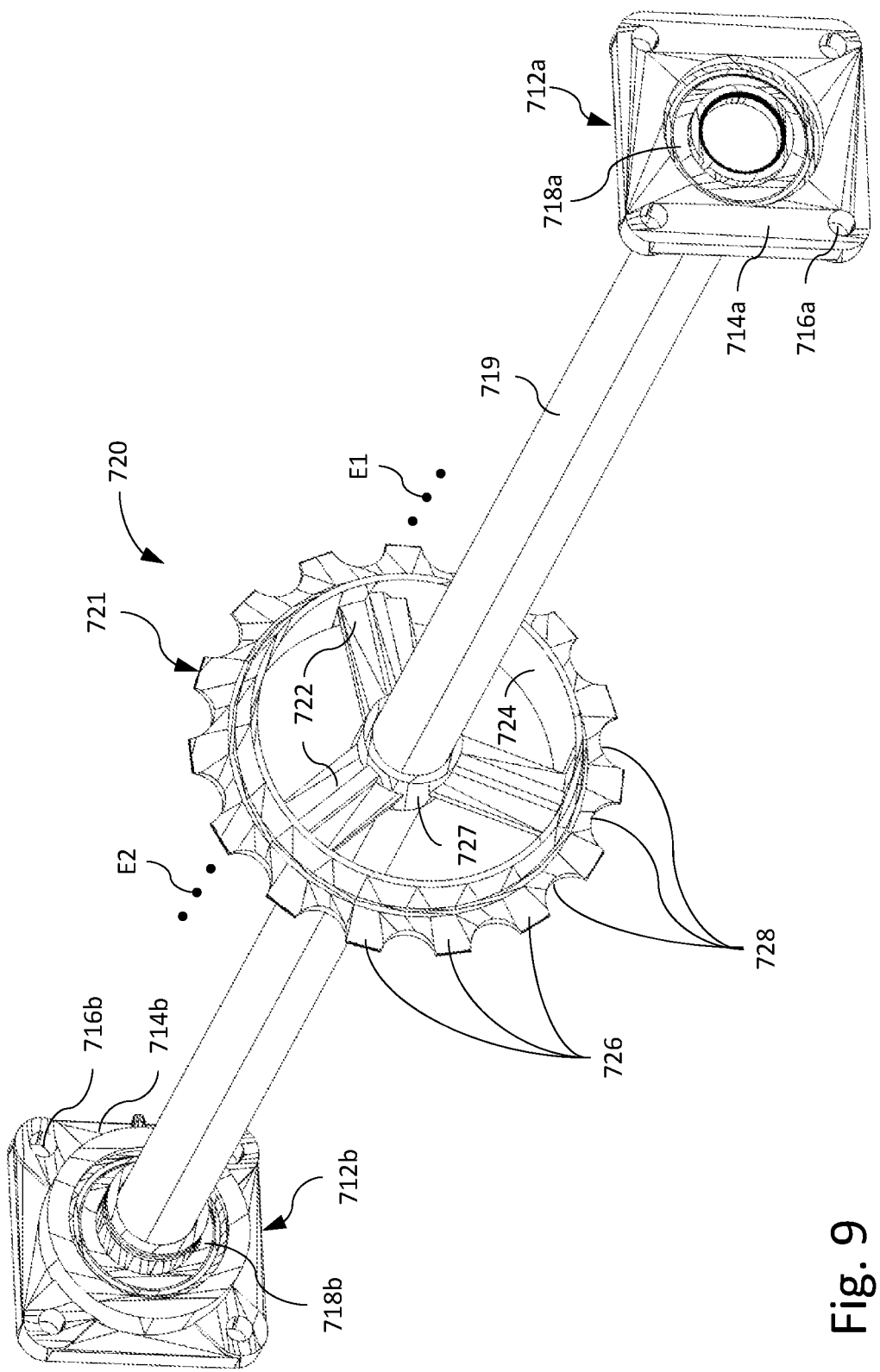
FIG. 9 is a perspective view of certain components of the tow-behind roller tool FIG. 1 in a partially disassembled state.

The adjustability of the suspension assembly 740 also includes an offset, partially compressed state of adjustment illustrated in FIG. 4 wherein the spring 752 of the compressible suspension member 750b of can be compressed by a compression distance C to adjust the roller assembly 710 to a tilted position T. The spring 752 can be maintained in such as a compressed state by a pin which passes through aligned apertures of the lower shaft member 756b and the upper shaft member 751b. In such states of adjustment, the suspension assembly 740 and the tool assembly may also be adjusted between a raised position in which the tool assembly 710 is raised above the underlying ground surface GS and a lowered position in which the tool assembly 710 contacts the underlying ground surface GS. The tilted position of roller assembly 710 facilitates a number of grading operations including, for example, gravel driveway crowning.

The ground-contacting roller 720 is configured and provided as a cultipactor in the illustrated embodiment. The cultipactor form of the ground-contacting roller 720 includes a plurality of cultipactor wheels 721. The outer surfaces of cultipactor wheels 721 include a circumferential array of teeth 726 and valleys 728. A plurality of spokes 722 are coupled with and extend radially between a hub 727 and an inner surface 724 of the cultipactor wheels 721. A plurality of cultipactor wheels 721 are mounted on a shaft 719 which extends between and is rotatably coupled with first and second bearing assemblies 712a, 712b. The bearing assemblies 712a, 712b include bearings 718a, 718b which are received by bearing housings 714a, 714b and are coupled with the brackets 734a, 734b by bolts which pass through apertures 716a, 716b or by other attachment, coupling, or fastening mechanisms.

In other embodiments, the ground-contacting roller 720 may be configured and provided in other forms, for example, as a roller with a continuous, cylindrical outer surface, a row of harrow discs, or other roller forms. It is further contemplated that a row of fixed, rigid shanks may be utilized in on some embodiments in place of a roller.

While exemplary embodiments of the disclosure have been illustrated and described in detail in the drawings and foregoing description, the same is to be considered as illustrative and not restrictive in character, it being understood that only certain exemplary embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. An apparatus comprising:
a roller assembly including a first beam extending laterally along a length, first and second posts extending upward from the first beam at respective first and second post locations laterally spaced apart along the length of the first beam, first and second brackets extending downward from the first beam at respective first and second bracket locations laterally spaced apart along the length of the first beam, and a ground-contacting roller rotatably coupled with the first and second brackets and extending axially from a first end to a second end;
a suspension assembly including first and second receivers coupled with the first and second posts, a second beam coupled with and extending laterally intermediate the first and second receivers, first and second compressible suspension members coupled with and extending vertically upward from the second beam, a crossbar positioned vertically upward from the second beam and coupled with and extending between the first and second compressible suspension members, and first and second pull arms extending longitudinally forward of the first and second receivers; and
a flexible rigging assembly including a connector bar, first and second upper flexible rigging members coupled with the connector bar and coupled with the crossbar, first and second lower flexible rigging members coupled with the connector bar and coupled with the second beam.

2. The apparatus of claim 1 comprising a work machine operatively coupled with the suspension assembly.

3. The apparatus of claim 2 wherein the work machine is operatively coupled with the suspension assembly by at least one of the first and second pull arms being coupled with the suspension assembly, extending in a longitudinally forward direction, and being rotatably coupled with the work machine.

4. The apparatus of claim 3 wherein the work machine is further operatively coupled with the suspension assembly by the connector bar being operatively coupled with a lifting mechanism of the work machine.

5. The apparatus of claim 4 wherein the lifting mechanism comprises a lifting arm operatively coupled with the connector bar.

6. The apparatus of claim 4 wherein the lifting mechanism is adjustable to raise and lower the roller assembly and the suspension assembly relative to an underlying ground surface.

7. The apparatus of claim 4 wherein the lifting mechanism is adjustable to compress and decompress the first and second compressible suspension members of the suspension assembly to vary down force applied by the roller assembly to an underlying ground surface.

8. The apparatus of claim 4 wherein the lifting mechanism is adjustable over a first range to move the roller assembly between a first position in which the roller assembly is spaced apart from an underlying ground surface and a second position in which the roller assembly contacts the underlying ground surface.

9. The apparatus of claim 8 wherein the lifting mechanism is adjustable over a second range in which the roller assembly contacts the underlying ground surface with respective degrees of slack in the first and second upper flexible rigging members and the first and second lower flexible rigging members are variable between a first state in which the first and second lower flexible rigging members are taut and the first and second upper flexible rigging members have a maximum amount of slack and a second state in which the first and second upper flexible rigging members are taut and the first and second lower flexible rigging members have a maximum amount of slack.

10. The apparatus of claim 9 wherein the lifting mechanism is adjustable over a third range in which the roller assembly contacts the underlying ground surface, the first and second upper flexible rigging members are taut, and a degree of compression of the first and second compressible suspension members is variable from a minimum degree of compression to a maximum degree of compression.

11. An apparatus comprising:
- a roller assembly including a roller frame and ground-contacting roller rotatably coupled with the roller frame,
- a suspension assembly including at least one compressible suspension member operatively coupled with the roller assembly,
- a flexible rigging assembly comprising at least an upper flexible rigging member operatively coupled with the suspension assembly at a first location relative to the at least one compressible suspension member and a lower flexible rigging member operatively coupled with the suspension assembly at a second location relative to the at least one compressible suspension member,
- wherein the first location and the second location are spaced apart from one another by a distance, the distance being variable in response to compression of the at least one compressible member, and
- the flexible rigging assembly is adjustable between a first state in which the upper flexible rigging member is taut and the lower flexible rigging member has a non-zero amount of slack and a second state in which the lower flexible rigging member is taut and the upper flexible rigging member has a non-zero-amount of slack.

12. The apparatus of claim 11 wherein the roller frame of the roller assembly includes a first beam extending laterally along a length.

13. The apparatus of claim 12 wherein the roller frame of the roller assembly includes first and second posts extending upward from the first beam at respective first and second post locations laterally spaced apart along the length of the first beam.

14. The apparatus of claim 13 wherein the roller frame of the roller assembly includes first and second brackets extending downward from the first beam at respective first and second bracket locations laterally spaced apart along the length of the first beam.

15. The apparatus of claim 14 wherein the ground-contacting roller is rotatably coupled with the first and second brackets at respective first and second axial ends.

16. The apparatus of claim 12 wherein the suspension assembly includes a second beam coupled with the roller assembly and extending laterally along a second beam length.

17. The apparatus of claim 16 wherein the suspension assembly includes first and second compressible suspension members coupled with and extending vertically upward from the second beam.

18. The apparatus of claim 17 wherein the suspension assembly includes a crossbar positioned vertically upward from the second beam and coupled with and extending between the first and second compressible suspension members.

19. The apparatus of claim 18 wherein the suspension assembly includes first and second pull arms extending in a longitudinally forward direction.

20. The apparatus of claim 19 including a work machine wherein the first and second pull arms are rotatably coupled with the work machine and the flexible rigging assembly is coupled with a lifting member of the work machine.

* * * * *